United States Patent [19]
Plummer

[11] 3,877,044
[45] Apr. 8, 1975

[54] REFLEX CAMERA VIEWING SYSTEM WITH STIGMATIC EXIT PUPIL

[75] Inventor: William T. Plummer, Concord, Mass.

[73] Assignee: Polaroid Corporation, Cambridge, Mass.

[22] Filed: July 21, 1972

[21] Appl. No.: 273,973

Related U.S. Application Data
[63] Continuation of Ser. No. 103,259, Dec. 31, 1970, abandoned.

[52] U.S. Cl. .................. 354/224; 354/155; 354/158
[51] Int. Cl. ......................................... G03b 13/00
[58] Field of Search ................ 95/42, 11 V, DIG. 2; 354/219, 224, 225, 152, 155, 158; 350/9, 33, 34

[56] References Cited
UNITED STATES PATENTS
3,043,181  6/1962  Brown et al. ........................... 95/42
3,232,197  2/1966  Kasahara ................................ 95/42
3,672,281  6/1972  Land ....................................... 95/42

OTHER PUBLICATIONS
The Focal Encyclopedia of Photography, "Aberrations of Lenses", 1960, pp. 5–6.

*Primary Examiner*—Samuel S. Matthews
*Assistant Examiner*—E. M. O'Connor
*Attorney, Agent, or Firm*—Frederick H. Brustman; John W. Ericson

[57] ABSTRACT

This specification describes a reflex camera with an off-axis viewer having a novel aperture stop to provide the viewer with a stigmatic exit pupil. One embodiment of the aperture stop has its horizontal edges separated from its vertical edges by forming them as orthogonal slots in different surfaces spaced along an optical path joining the camera and the viewer.

25 Claims, 6 Drawing Figures

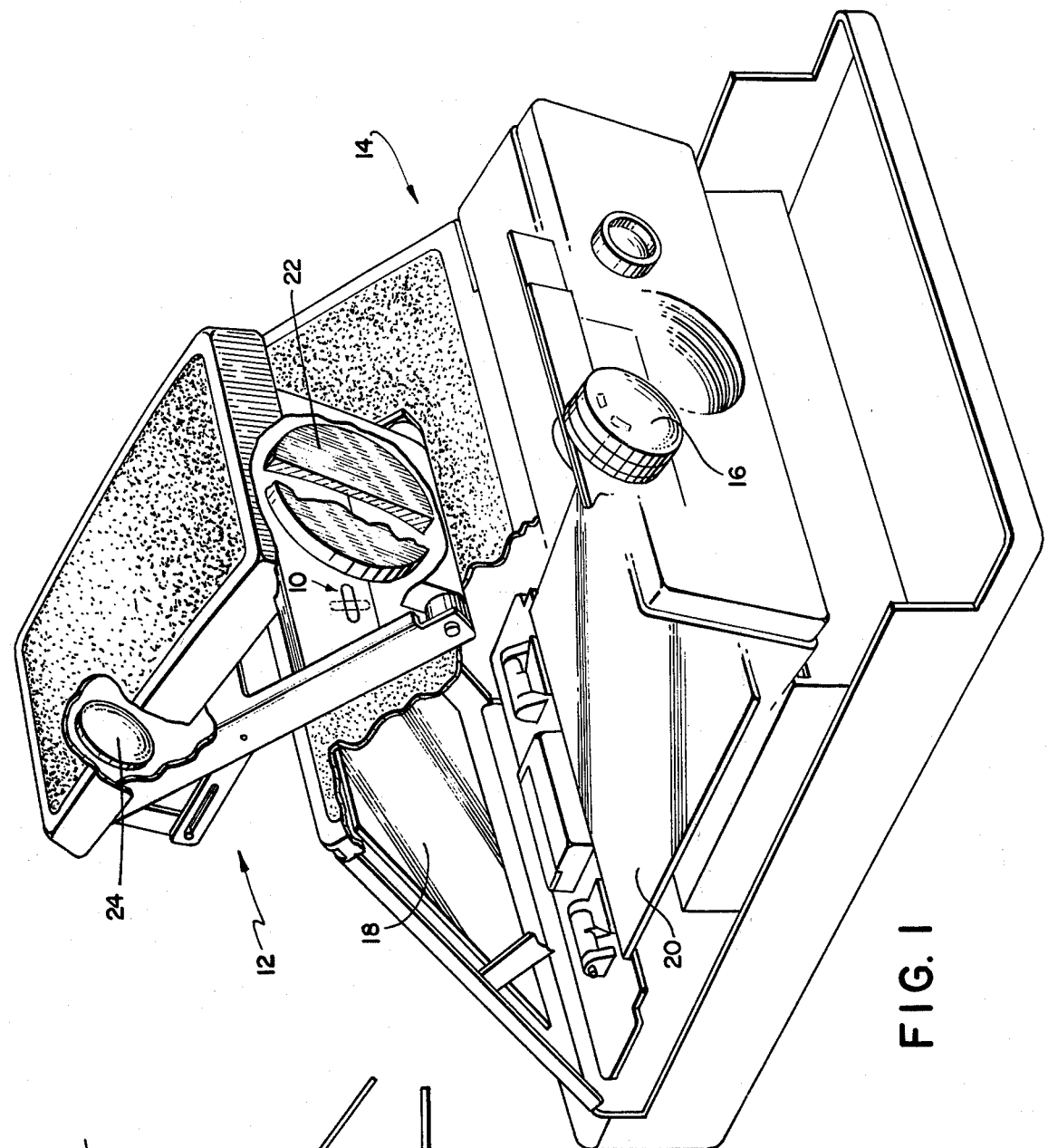
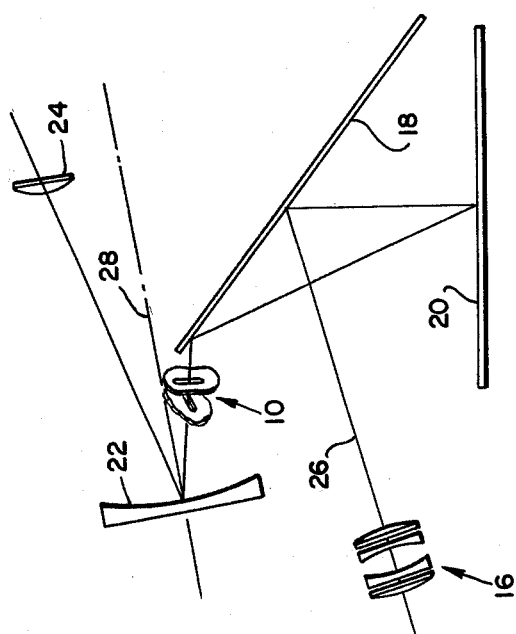

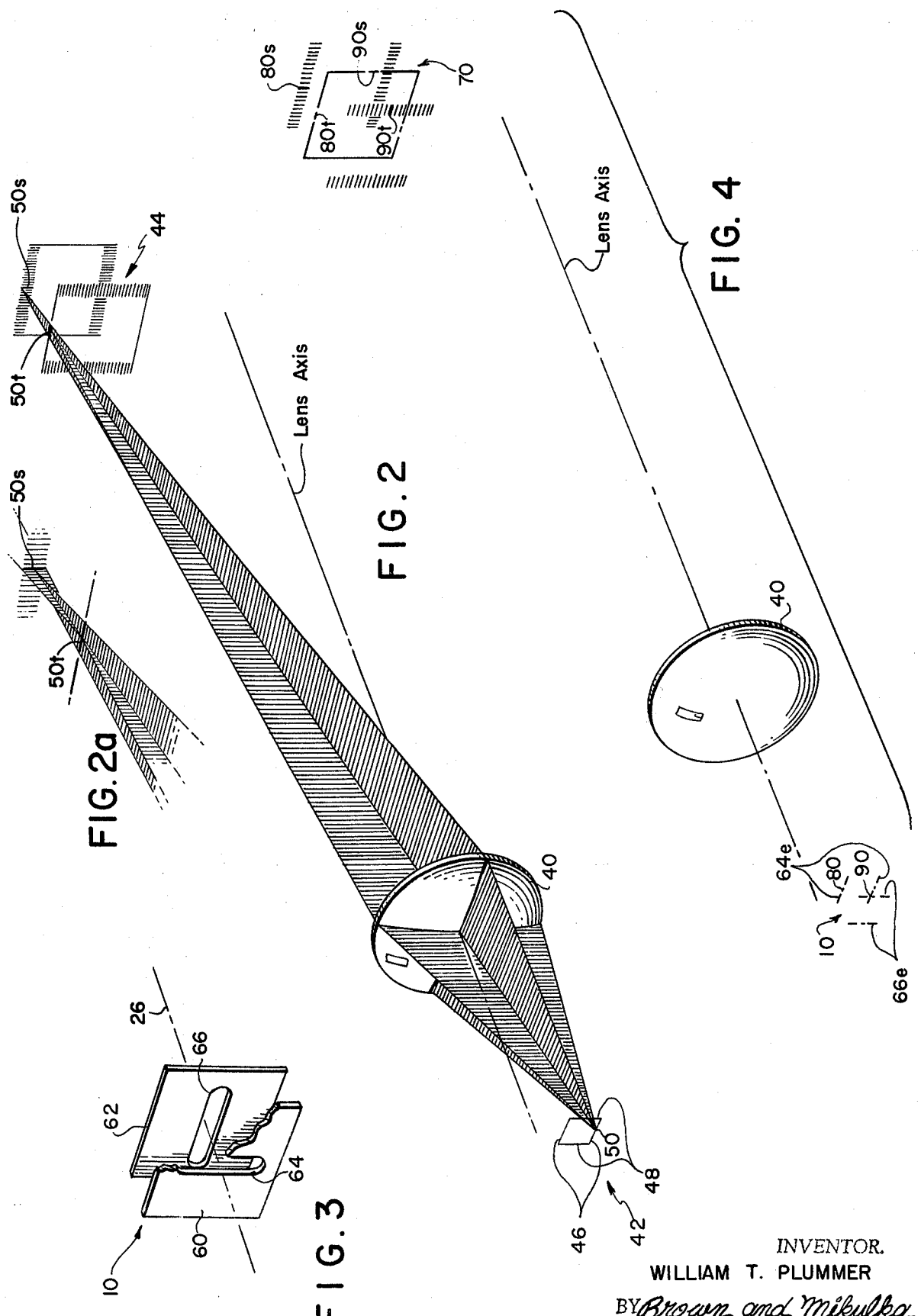

REFLEX CAMERA VIEWING SYSTEM WITH STIGMATIC EXIT PUPIL

CROSS REFERENCE TO RELATED APPLICATIONS

This application is a continuation of U.S. pat. application Ser. No. 103,259, filed Dec. 31, 1970 now abandoned.

BACKGROUND OF THE INVENTION

The present invention particularly relates to non-axial (alternatively, off-axis) optical systems. Non-axial optical systems are characterized by a system axis (the nominal light path) which obliquely intersects the principal image-forming elements of the system, e.g., at an angle to the optic axis of the image-forming elements. With a prior art aperture stop separated from the image-forming element, an astigmatic exit pupil will be formed. The horizontal and vertical elements of the astigmatic exit pupil focus sharply in different planes along the axis of the optical system and their separation may be quite noticeable. The separation is caused by astigmatism inherent in the location of the aperture stop off the optic axis.

In some optical systems, similar astigmatism may stem from a strong aberration correcting perturbation of the image-forming element, rather than from an off-axis location of the aperture stop.

A stigmatic exit pupil represents a desirable improvement, particularly in optical systems for visual use. The horizontal and vertical elements of the stigmatic exit pupil focus sharply in a common plane. The stigmatic exit pupil enables a user to position his eye comfortably and aids in precisely defining a field of view for the system.

Prior to the present invention, which corrects astigmatism in the exit pupil by shaping the aperture stop, astigmatism was corrected by optical means (i.e., lens power). This often meant compromising the corrections for other aberrations present in an image to improve the exit pupil.

SUMMARY OF THE INVENTION

The present invention achieves the advantages of a stigmatic exit pupil by using a special aperture stop. In one embodiment of the novel aperture stop, two elongated slots, mutually orthogonal, but in different planes along the axis of the optical system, delineate the edges of the aperture stop. Hypothetically, the aperture stop of the present invention has simulated astigmatism. The simulated astigmatism balances astigmatism introduced by the image-forming elements of the optical system whereby the exit pupil is provided with a pair of horizontal edges and a pair of vertical edges focused sharply in a common plane. Thus, the exit pupil appears stigmatic.

An object of the present invention is to improve an image, formed by an optical system, of an object by means of shaping the object so as to compensate for the aberrations otherwise present in the image.

Another object of the present invention is to ameliorate the aberrations present in the exit pupil of an optical system without affecting an image of a subject formed by said optical system.

Yet another object of the present invention is to form a rectilinear aperture stop having its horizontal edges separated from its vertical edges in relation to the astigmatism otherwise inherent in the optical system.

Other objects of the invention will in part be obvious and will in part appear hereinafter.

The invention, accordingly, comprises the apparatus possessing the construction, combination of elements and arrangement of parts which are exemplified in the following detailed disclosure, the scope of the application of which will be indicated in the claims.

DESCRIPTION OF THE DRAWINGS

For a fuller understanding of the nature and objects of the invention, reference should be had to the following detailed description taken in connection with the accompanying drawings wherein:

FIG. 1 illustrates a reflex camera having a viewer with an embodiment of a novel aperture stop;

FIG. 1a shows, schematically, the optical system of the reflex camera and the viewer illustrated in FIG. 1;

FIG. 2 shows, schematically, the formation of an astigmatic exit pupil by a lens having an off-axis aperture stop;

FIG. 2a shows an enlarged detail of FIG. 2;

FIG. 3 illustrates an embodiment of a novel aperture stop according to the present invention; and FIG. 4 shows, schematically, the formation of a stigmatic exit pupil by a lens with a novel aperture stop according to the present invention.

DESCRIPTION OF THE PREFERRED EMBODIMENT

FIG. 1 illustrates a novel aperture stop 10 installed in the optical path of a viewer 12 of a reflex camera 14. The reflex camera 14 includes an objective lens 16, a reflex mirror 18, and a reflective focusing screen 20. The objective lens 16 forms a real image on the reflective focusing screen 20 via the reflex mirror 18. Light, emanating from the real image, enters the non-axial viewer 12 through the novel aperture stop 10. An image-forming mirror 22 reflects the light into an aerial image of the scene formed on the focusing screen 20. The aerial image is magnified by an eye lens 24 for an observer having his eye at the viewer 12's exit pupil (not shown). Copending U.S. patent application, Ser. No. 98,356, filed Dec. 15, 1970, in the name of James G. Baker, entitled "Reflex Camera and Viewing Device", and assigned to Polaroid Corporation, describes the foregoing optical arrangement in greater detail.

For a better understanding of the optical system of the camera 14 and of the viewer 12, reference should be had to FIG. 1a in conjunction with FIG. 1. A chief ray, having its origin at the center of camera 14's field, defines the system axis 26 of the viewer 12 and the camera 14. The chief ray enters along objective lens 16's axis, is reflected by the reflex mirror 18, and strikes the center of the focusing screen 20. The chief ray then radiates from the focusing screen 20, is reflected from the reflex mirror 18, and passes through the center of the novel aperture stop 10. After passing through the center of the viewer 12's novel aperture stop 10, it is reflected obliquely from the center of the image-forming mirror 22 toward the eye lens 24.

For the purpose of the present disclosure, the image-forming mirror 22 has a spherical reflecting surface, but the practitioner must understand that he can use other mirror shaped and/or lenses while practicing the invention described herein.

The image-forming mirror 22 has an optic axis 28 (i.e., its axis of symmetry). The system axis 26 is oblique to the optic axis 28 and the novel aperture stop 10 is located below the optic axis 28 (i.e., off-axis).

Despite the off-axis location, using the novel aperture stop 10 results in a stigmatic exit pupil for the viewer 12, because the aperture stop 10's simulated astigmatism balances the system's optical astigmatism. Therefore, the optical elements 22 and 24 can be optimized to otherwise correct the image seen through the viewer 12 without compromising their design to obtain a stigmatic exit pupil.

A full explanation of astigmatism is unnecessary for an understanding of the present invention, but a short description of its nature and appearance, as it affects the exit pupil of the off-axis viewer 12, is deemed useful.

When a lens or mirror, etc., forms the image of a point located a substantial distance from its optic axis, the tangential light rays emanating from the point may focus closer to the lens than the sagittal light rays emanating from the same point. Tangential light rays refer to the fans of rays intersecting the lens along lines parallel to the intersection of the tangential plane with the lens; the optic axis and the off-axis point describe the tangential plane. Sagittal light rays refer to the fans of rays intersecting the lens along lines parallel to the intersection of the sagittal plane with the lens; the principal ray and a perpendicular to the tangential plane describe the sagittal plane. All of the light reaching the image-forming element from the point can be resolved into a plurality of tangential and sagittal fans.

Each fan of tangential rays focuses at the tangential focus, but the tangential fans themselves converge at the sagittal focus. In contradistinction, each fan of sagittal rays focuses at the sagittal focus, but the sagittal fans themselves converge at the tangential focus. Thus, each tangential fan focuses along a tangential focal line perpendicular to the tangential plane, and each sagittal fan focuses along a sagittal focal line perpendicular to the sagittal plane. Note that the sagittal focal line and the tangential plane parallel one another and so do the tangential focal line and the sagittal plane.

The image of the point at the tangential focus is not perfect; it blurs (spreads) along the tangential focal line. Similarly, the image of the point at the sagittal focus blurs along the sagittal focal line. Thus, an image of an off-axis line parallel to the tangential plane (i.e., the sagittal focal line) appears sharp at the sagittal focus, but blurred at the tangential focus. This is because blur in the sagittal image, of each of the points comprising said off-axis line, is not readily apparent; it is parallel to the line's direction. However, blur in the tangential image is perpendicular to the line's direction and, therefore, quite evident. For like reasons, an image of an off-axis line parallel to the sagittal plane appears sharp at the tangential focus, but blurred at the sagittal focus.

FIG. 2 shows, schematically, a lens 40 having an off-axis, prior art, aperture stop 42 and a resultant astigmatic exit pupil 44. The aperture stop 42 lies below the optic axis of the lens 40. Choosing the lens 40 to represent the image-forming element simplifies the present illustration; the practitioner will appreciate that the present description also pertains to mirrors and other kinds of image-forming elements including some which can reverse the relative positions of the tangential and the sagittal foci.

The horizontal edges 46 and the vertical edges 48 of the aperture stop 42 lie in a common plane. A tangential and a sagittal ray fan emanating from a point 50 illustrate the astigmatic phenomena described above. While the point 50 is shown on a horizontal edge 46, it could just as well be on a vertical edge 48.

Referring now to FIG. 2a, one sees that the rays in the tangential fan (vertical shading) focus at a tangential line $50t$; however, a plurality of tangential fans (not shown) from the point 50 converge elsewhere thereby spreading their foci to form the tangential focal line $50t$. In a similar manner, the rays in the sagittal fan (horizontal shading) focus at a sagittal focal line $50s$ while a plurality of sagittal fans (not shown) from the point 50 converge elsewhere spreading their foci to form the sagittal focal line $50s$.

Referring back to FIG. 2, the lens 40 refracts the light rays emanating from the point 50 toward the exit pupil 44. Arriving at the tangential focal plane the rays focus sharply only in the vertical direction forming image $50t$; further on at the sagittal focal plane, the rays focus sharply only in the horizontal direction forming the image $50s$. Light from every other point along the aperture stop 42's edges 46 and 48 behaves in a similar manner. The horizontal edges 46 appear sharply focused in the tangential focal plane, but blurred in the sagittal focal plane, and vice versa for the vertical edges 48. Consequently, the exit pupil 44 exhibits astigmatism because its orthogonal edges appear sharply focused in different planes separated along the system axis.

Refer now to FIG. 3. An important feature of the novel aperture stop 10 is a separation of its horizontal edges and its vertical edges along the system axis 26. This is achieved by using two plates 60 and 62, each having a single elongated slot 64, in plate 60, and 66, in plate 62. The length of each slot exceeds the width of the other slot. Crossing the slots 64 and 66 orthogonally and centering them forms a square aperture through the pair of plates 60 and 62. Two of its parallel edges are delineated by slot 64, and its other two parallel edges are delineated by slot 66. The separation of plates 60 and 62 along the system axis 26 is predetermined with respect to the amount of astigmatism otherwise present in the exit pupil of the optical system.

Reference may now be had to FIG. 4 which shows, schematically, the cooperation between the novel aperture stop 10, as illustrated in FIG. 3, and the lens 40 to form a stigmatic exit pupil 70. For clarity, FIG. 4 shows only those portions $64_e$ and $66_e$ of the slots' edges which actually delineate the edges of the aperture stop 10. Separating the edges $64_e$ and $66_e$ along the system axis separates their respective tangential and sagittal foci along the system axis. The vertical edges $66_e$ are further from the lens 40 than the horizontal edges $64_e$, and the foci of the vertical edges $66_e$ are closer to the lens 40 than are the foci of the horizontal edges $64_e$. Sufficient separation between the horizontal edges $64_e$ and the vertical edges $66_e$ brings the tangential focus $80t$ of the horizontal edges $64_e$ into the same plane as the sagittal focus $90s$ of the vertical edges $66_e$, thereby forming the stigmatic exit pupil 70. By stigmatic is meant that a set of well-focused edges delineating the exit pupil 70 lie in a common plane. The blurred images of the aperture stop 10's edges, represented by $80s$ and 90t, fall where they may; they do not detract from the stigmatic appearance of the exit pupil 70, as perceived by a user. In effect, one constructs the novel aperture stop 10 with its own simulated astigmatism in a degree equal and opposite to that introduced by the lens 40. Thus, the simulated astigmatism of the aperture stop 10 balances the astigmatism caused by the lens 40 to form a stigmatic exit pupil 70. The exit pupil 70 may still exhibit coma and other aberrations even though corrected for astigmatism. Correction of such coma and other aberrations in the exit pupil can be effected by carefully shaping the edges $64_e$ and $66_e$ in a predetermined manner.

The practitioner will now appreciate that the separation between the horizontal and vertical edges of a particular aperture stop according to the present invention will depend upon the optical system it serves. The separation for a particular application can be determined empirically by varying the separation, after mounting the aperture stop, until it forms a satisfactory exit pupil. Alternatively, the separation can be predetermined using formulae available in standard references.

To promote the reader's comprehension of the invention, the specification describes a rectilinear aperture stop in conjunction with a lens. The practitioner can now understand how to apply the invention's principles to other aperture shapes and other optical elements. The practitioner will also understand that the principles of the present invention are applicable to shaping certain objects to compensate for the aberrations which would otherwise be present in the image of the object as formed by a particular optical system.

Since certain changes may be made in the above apparatus without departing from the scope of the invention herein involved, it is intended that all matter contained in the above description or shown in the accompanying drawings shall be interpreted as illustrative and not in a limiting sense.

I claim:

1. A photographic camera having a system axis, and comprising:
   focusing screen means;
   lens means for forming a real image of a subject on said focusing screen means;
   off-axis viewing means for observing said real image on said focusing screen means; and
   aperture stop means, transverse to a light path between said off-axis viewing means and said focusing screen means, configured to ameliorate aberrations in the image of said aperture stop means formed by said off-axis viewing means which aberrations would be present in the image formed by said off-axis viewing means of an aperture stop having a circular planar periphery.

2. A photographic camera having a system axis, and comprising:
   focusing screen means;
   lens means for forming a real image of a subject on said focusing screen means;
   viewing means, including an approximately ellipsoid concave reflector, for observing said real image on said focusing screen means; and
   aperture stop means, transverse to a light path between said approximately ellipsoid concave reflector and said focusing screen means, having a shape that provides said viewing means with a stigmatic exit pupil.

3. The photographic camera described in claim 2, wherein a first focus of said approximately ellipsoid concave reflector is closer to said focusing screen means than its second focus, and said aperture stop means is situate proximate said first focus.

4. An optical system with an exit pupil, including:
   image-forming means having an optical axis which is oblique to the axis of said optical system; and
   aperture stop means positioned conjugate to said exit pupil, with respect to said image-forming means, said aperture stop means being configured to ameliorate aberrations in said exit puipil which would be introduced by said image-forming means with an aperture stop which defines a circular planar aperture and said aperture stop means thereby increases the illumination passing through said exit pupil over that which would be passed through said exit pupil by the circular planar aperture.

5. In combination with an optical system having an off-axis entrance pupil for forming an image of a subject, an aperture stop including:
   a first apertured plate; and
   a second apertured plate positioned in predetermined spaced parallel relation with said first apertured plate, whereby said optical system will focus an image of the apertures of said apertured plates to define a stigmatic exit pupil without affecting the image of said subject.

6. An apparatus for use in an optical system, said apparatus comprising:
   aperture stop means, transverse to the light path through said optical system, having aperture defining edge portions with a configuration that separates at least a first of said aperture defining edge portions from a second of said aperture defining edge portions by a predetermined distance lengthwise along said light path so as to ameliorate aberrations otherwise present in said optical system's exit pupil.

7. An aperture stop for an optical system, comprising:
   a first surface, positioned transverse to the light path of said optical system, having an opening therein for light to pass through;
   a second surface, positioned transverse to said light path and proximate said first surface, having an opening therein for said light to pass through; and
   means for separating said first and said second surfaces a predetermined distance such that aberrations otherwise present in the exit pupil of said optical system are ameliorated.

8. The aperture stop described in claim 7 wherein said openings include edges defining their boundaries and at least a portion of the edge of said opening in said first surface delineates at least a portion of said aperture stop and at least a portion of the edge of said opening in said second surface delineates another portion of said aperture stop.

9. In combination with an optical system of the type having image-forming means characterized by its own optic axis, and an aperture stop, spaced apart from said optic axis, which defines an exit pupil for said image-forming means; the improvement which comprises:
   means, including edge portions, for defining said aperture stop wherein the portions of the edges of said means for defining said aperture stop which are parallel to a sagittal focal line of said image-forming means are spaced apart a predetermined distance along the axis of said optical system from the portions of the edges of said means which are parallel to a tangential focal line, whereby said exit pupil is stigmatic.

10. The optical system in claim 9 wherein said edges portions which are parallel to said sagittal focal line are further from said image-forming means by a given distance than said edge portions which are parallel to said tangential focal line.

11. In combination with an optical system of the type having image-forming means characterized by its own optic axis, and an aperture stop having at least one edge, positioned off said optic axis, which defines an exit pupil for said image-forming means; the improvement which comprises:
  first means for delineating an edge of said aperture stop, said first means being parallel to the sagittal focal line of a point on said edge as formed by said image-forming means;
  second means for delineating another edge of said aperture stop, said second means being parallel to the tangential focal line of a point on said other edge as formed by said image-forming means; and
  means for spacing said first means apart from said second means and for positioning said first means further from said image-forming means than said second means; said spacing means separating said first means from said second means by a distance selected so said sagittal and said tangential focal lines are equi-distant from said image-forming means.

12. A viewing device having a stigmatic exit pupil, comprising:
  a concave mirror;
  a first plate, positioned off said mirror's axis, having an elongated slot therein; said slot being parallel to a sagittal focal line for a point on a lengthwise portion of its edge; and
  a second plate, positioned off said mirror's axis, having an elongated slot therein, and separated by a given distance from said first plate; said slot being parallel to a tangential focal line for a point on a length-wise portion of its edge whereby said first and second plates cooperate to define an aperture stop.

13. The viewing device of claim 12, wherein said second plate is closer to said concave mirror than said first plate.

14. A photographic camera having a system axis, and comprising:
  focusing screen means;
  lens means for forming light into a real image on a subject on said focusing screen means;
  off-axis viewing means for observing said real image on said focusing screen means; and
  a pair of elongated slots at right angles to each other, said slots being transverse to a light path between said off-axis viewing means and said focusing screen means and positioned to pass said light path through them, for ameliorating aberrations otherwise present in an exit pupil formed by said off-axis viewing means.

15. The photographic camera described in claim 14, wherein said pair of elongated slots are separated from each other a predetermined distance measured along said light path.

16. A photographic camera having a system axis, and comprising:
  focusing screen means;
  lens means for forming light into a real image of a subject on said focusing screen means;
  viewing means, including an approximately ellipsoid concave reflector, for observing said real image on said focusing screen means; and
  a pair of elongated slots at right angles to each other, said slots situate proximate a focus of said approximately ellipsoid concave reflector disposed toward said focusing screen means, and positioned to pass said light through them; said slots being transverse to the path of said light between said approximately ellipsoid concave reflector and said focusing screen means, for providing said viewing means with a stigmatic exit pupil.

17. The photographic camera described in claim 16, wherein said pair of elongated slots are separated from each other a predetermined distance measured along said light path.

18. An apparatus for ameliorating aberrations in an exit pupil of an optical system, said apparatus comprising:
  a first pair of edge portions, bounding an opening, that are parallel to each other; and
  a second pair of edge portions, bounding an opening, that are parallel to each other, said first pair of edge portions being proximate, along an axis of said optical system, to said second pair of edge portions, said first pair of edge portions being orthogonal to said second pair of edge portions so as to define a rectangular aperture stop, both said pairs of edge portions being transverse to said axis.

19. A photographic camera having a system axis, and comprising:
  focusing screen means;
  lens means for forming a real image of a subject on said focusing screen means;
  off-axis viewing means for observing said real image on said focusing screen means; and
  aperture stop means, transverse to a light path between said off-axis viewing means and said focusing screen means, having a shape for providing said off-axis viewing means with a stigmatic exit pupil; said shape defining an aperture having a non-planar periphery.

20. An optical system comprising:
  objective lens means for forming an image of a subject; and
  means for viewing said image, said viewing means including aperture stop defining means, including aperture defining edge portions, and means for forming an image of said aperture stop defining means to constitute an exit pupil, said aperture stop defining means being positioned off the optical axis of said means for forming an image of said aperture stop defining means, said aperture stop defining means being structurally configured to present said aperture defining edge portions at different locations lengthwise of said optical axis to substantially ameliorate image aberrations otherwise present in said exit pupil.

21. An optical system comprising:
  objective lens means for forming an image of a subject; and means for viewing said image, said viewing means including aperture stop defining means and means defining an optical path, said aperture stop defining means including aperture defining edge portions, and means, along said optical path, for forming an image of said aperture stop defining means to constitute an exit pupil, said aperture stop defining means being positioned along said optical path, said means defining an optical path including said means for forming an image of said aperture stop defining means, said aperture stop defining means being structurally configured to present said aperture defining edge portions at different locations lengthwise of said optical path to substantially ameliorate image aberrations otherwise present in said exit pupil.

22. Aperture stop means defining a non-planar aperture for use transverse to the light path through an optical system and off-axis of an element of said optical system, said means having aperture defining edge portions in predetermined non-planar spatial relation such that said optical system will image the aperture defined by said means at a single plane.

23. The aperture stop means described in claim 22, including an opening in a first surface and an opening in a second surface which openings each comprise an elongated slot of the same size.

24. An aperture stop for an optical system, comprising:
a first surface, positioned transverse to the light path of said optical system, having an opening therein for light to pass through, wherein the length of said opening in said first surface exceeds the width of said opening in said first surface;

a second surface, positioned transverse to said light path and proximate said first surface, having an opening therein for said light to pass through, wherein the length of said opening in said second surface exceeds the width of said opening in said second surface and the width of said opening in said first surface, and said opening in said second surface is positioned transverse said opening in said first surface; and means for separating said first and said second surfaces a predetermined distance such that aberrations otherwise present in the exit pupil of said optical system are ameliorated.

25. In combination with an optical system of the type having image-forming means characterized by its own optic axis, and an aperture stop, spaced apart from said optic axis, which defines an exit pupil for said image-forming means; the improvement which comprises:
means for defining said aperture stop including a pair of plates, each of said plates having an elongated slot therein, said slots being orthogonal to each other, said plates being spaced along a line through said slots with a separation between said plates such that the aperture defining edge portions of said slots which are parallel to a sagittal focal line of said image-forming means are spaced apart a predetermined distance along the axis of said optical system from the aperture defining edge portions of said means which are parallel to a tangential focal line so that exit pupil is stigmatic.

* * * * *